United States Patent Office 3,269,894
Patented August 30, 1966

3,269,894
SYNERGISTIC ORGANO-PHOSPHATE
INSECTICIDES
Uwe Fetzer, Ivar Ugi, and Heinrich Jarczyk, Leverkusen, Wolfgang Behrenz, Wuppertal-Elberfeld, and Günter Unterstenhöfer, Opladen, Germany, assignors to Farbenfabriken Bayer Aktiengesellschaft, Leverkusen, Germany, a German corporation
No Drawing. Filed Oct. 28, 1963, Ser. No. 319,579
Claims priority, application Germany, Aug. 26, 1963,
F 38,185
14 Claims. (Cl. 167—22)

The present invention relates to and has as its object phosphorus-containing compounds which possess a synergistic action when employed together with other phosphorus-containing insecticides.

In accordance with the present invention it has been found that phosphorus compounds of the general formula

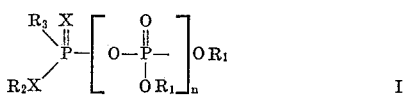

in which $R_1$ and $R_2$ stand for hydrogen, an equivalent of an alkali metal or alkaline earth metal or for optionally substituted aryl, $R_3$ denotes optionally substituted alkyl, alkoxy, alkylmercapto, or aryl-mercapto, X stands for oxygen or sulphur and $n$ is zero or a whole number from 1 to 10, possess a synergistic action when administered together with phosphorus-containing insecticides.

The synergistic action consists in that the phosphorus insecticides are rendered effective even against those pests which have become resistant to other known phosphorus insecticides. There is moreover an increase of the effectiveness of the phosphorus-containing insecticides against non-resistant pests.

The substances to be used according to the invention are characterised by the above Formula I. If $R_1$ and $R_2$ stand for aryl radicals, they are especially phenyl or naphthyl. These aryl radicals are preferably substituted by halogen atoms, such as chlorine or bromine, alkyl radicals with 1 to 3 carbon atoms, alkoxy radicals with 1 to 3 carbon atoms, aroxy radicals, such as phenoxy, alkylmercapto radicals with particularly 1 to 4 carbon atoms, arylmercapto radicals, especially phenylmercapto, and trifluoromethyl. These derivatives of the compounds according to the invention are especially effective in which $R_1$ and $R_2$ stand for phenyl radicals with chlorine atoms in 2- or 3-position or lower alkyl radicals.

If $R_3$ stands for alkyl, it preferably denotes alkyl radicals with 1 to 4 carbon atoms, which are expediently substituted by hydroxy groups, amino groups or halogen atoms, such as chlorine, fluorine or bromine. If $R_3$ stands for alkoxy or alkylmercapto groups, these preferably contain 1 to 4 carbon atoms. The phenyl mercapto group is preferred among the arylmercapto groups.

If $n$ stands for zero, derivatives of phosphoric acid or phosphoric acid are involved, if $n$ stands for 1, the corresponding pyrophosphoric or pyrophosphonic acids are involved. If $n$ stands for 2 to 10, the derivatives are those of metaphosphoric acids or metaphosphonic acids.

It is important that the compounds according to the invention can be employed not only in pure form but also in mixtures. It is indeed particularly expedient to produce such mixtures, since they possess the highest activity and are chemically especially simple to produce.

Among the inventive compounds characterised by the formula, as given above, the derivatives of 2- or 3-chlorophenol, of 2,4- 2,6- 3,4- or 3,5-dichloro- and of 2-chloro-6-methyl-phenol have proved especially effective. Examples of these are di-(3-chlorophenyl)-methyl-, di-(2-chloro-6-methylphenyl)-sodium-phosphate, tetra(2-chloro-6-methyl-phenyl)-pyro- and 2-chloro-6-methylphenyl-meta-phosphate which are obtained by reaction of di-(2-chloro - 6 - methylphenyl)-dichlorophosphate with methanolic caustic soda solution.

Further compounds according to the invention which may be mentioned are di - (3 - trifluoromethyl)-sodium phosphate, di-(2-cyanophenyl)-methylphosphate, α-naphthyl diethyl thiophosphate, 8-quinolyl diethyl phosphate, 4-hydroxy-2,3,5,6-tetrachlorophenyl diethyl phosphate, di-(3-chlorophenyl)-n-butyl thiolphosphate, (α-hydroxy-β, β,β-trichloroethyl)-phosphonic acid-di-(3 - chlorophenylester) and 4-chloropyrocatech-ol monoethyl phosphate.

The phosphorus compounds according to the invention are added to phosphorus-containing insecticides in the manner usual for synergistic substances. The phosphorus-containing insecticides are employed in customary manner, the various known formulations being usable.

The synergistic substances according to the invention have proved especially effective in combating biting and sucking insects, mites, especially spider mites, diptera and nematodes.

The synergistic substances according to the invention can be employed in various quantities together with the phosphorus-containing insecticides. In general the proportion by weight of synergistic material to active agent lies in the range of from 0.02:1 to 20:1, preferably between 0.5:1 to 5:1.

As pest control agents with which the synergistic substances can be combined, the following may be mentioned, for example:

O-ethyl-4-nitrophenyl-phenyl-phosphonothioate,
bis-(dialkoxy-phosphinothiolyl)-disulphide,
O,O-dimethyl-2,2,2-trichloro-n-butyryloxy-ethyl-
  phosphonate,
4-tert.-butyl-2-chloro-phenyl-methylmethylphos-
  phoramidate,
S-carbamoyl-methyl-O,O-dimethyl-dithiophosphonate,
O-(3-chloro-4-methyl-umbelliferone)-O,O-dimethyl-
  phosphorothioate,
2-(diethoxy-phosphinylthio)-ethyl-ethylmethyl-
  sulphonium-methyl-sulphate,
O,O-diethyl-S-2-(ethylthio)-ethylphosphoro-dithioate,
O,O-diethyl-O-3-chloro-4-methyl-2-oxo-2H-1-benzo-
  pyrane-7-yl-phosphoro-thioate,
O,O-diethyl-S-4-chlorophenyl-thiomethyl-phosphoro-
  dithioate,
diethyl-2-chlorovinylphosphate,
O,O-diethyl-O-2,4-diphenyl-phosphorothiate,
O,O-diethyl-S-(isopropyl-thiomethyl)-phosphoro-
  dithioate,
O,O-diethyl-O-(4-methyl-7-cumarinyl)-phosphorothiate,
O,O-diethyl-O-4-methylsulphinylphenyl)-phosphoro-
  thioate,
dithiophosphoric acid-O,O-diethyl-5-[4-oxy-(1,2,3)]-
  benzotriazine-3-methyl ester,
O,O-diethyl-O-[6-(3-(2-phenyl))-pyridazinoyl]-phos-
  phorothioate,
O,O-diethyl-S-(propylthio)-methyl-phosphorodithioate,
O,O-diethyl-O-(2-n-propyl-4-methylpyrimidinyl-6-)-
  phosphorothioate,
O,O-diethyl-O-[6-(3-2H-pyridazinoyl)]-phosphoro-
  thioate,
O,O-diethyl-S-β-diethylaminoethyl-phosphorothioate,
O,O-diethyl-O-(3,4-tetramethylene-umbelliferone)-
  thiophosphate,
O,O-diethyl-O-(2-isopropyl-4-methyl-6-pyrimidinyl)-
  phosphorothioate, dimethyl-2,2-dichlorovinyl-phosphate,
diethyl-dithiocarbamic acid anhydride of O,O-diisopropyl-thionophosphoric acid,
O,O-diisopropyl-S-isopropylmercapto-methyl-dithiophosphate,
O,O-diisopropyl-4-nitrophenylthiophosphate,
dimethyl-2-methoxy-carbonyl-1-methylvinylphosphate,
O,O-dimethyl-O-(2-chloro-4-nitrophenyl)-phosphorothioate,
O,O-dimethyl-O-(3-chloro-4-nitrophenyl)-phosphorothioate,
O,O-dimethyl-S-(4-chloro-phenyl-thiomethyl)-phosphorodithioate,
O,O-dimethyl-S-(4,6-diamino-1,3,5-triazine-2-yl)-methyl-phosphoro-thiolothi-onate,
dimethyl-1,2-dibromo-2,2-dichloroethyl-phosphate,
O,O-dimethyl-O-(4-methylmercapto-3-methylphenyl)-phosphorothioate,
O,O-dimethyl-S-morpholine-carbamoylmethyl-phosphorodithioate,
O,O-dimethyl-S-(4-oxobenzotriazine-3-methyl)-phosphorodithioate,
O,O-dimethyl-O-[6-(3-2H-pyridazinoyl)]-phosphorothioate,
O,O-dimethyl-O-(2,4,5-trichlorophenyl)-phosphorothioate,
2,3-p-dioxan-S,S-bis-(O,O-diethyl)-phosphorodithioate,
2-(O,O-dimethyl-phosphorothiolo-methyl)-5-methoxy-4-pyrone,
O,O,O',O'-tetraethyl-S,S'-methylene-bisphosphorodithioate,
O,O-diethyl-S-(N-isopropyl-carbamoylmethyl)-phosphorodithioate,
O,O-dimethyl-S-[1,2-di-(ethoxycarbamoyl)-ethyl-]-phosphorodithioate,
S-(N-ethoxycarbonyl-N-methylcarbamoylmethyl)-diethyl-phosphorothiolothionate,
O,O-dimethyl-S-[2-(ethylthio)-ethyl]-phosphorothioate,
O,O-dimethyl-O-[2-(ethylthio)-ethyl-]-phosphorothioate,
methyl-β-(ethylsulphoxy)-ethyl-2,2-dichloro-vinyl-phosphate,
O,O-dimethyl-S-(N-methylcarbamoylmethyl)-phosphorodithioate,
O,O-dimethyl-O-(4-nitrophenyl)-phosphorothioate,
diethyl-3-methyl-5-pyrazolyl-phosphate,
O,O-diethyl-O-(3-methyl-5-pyrazolyl)-phosphorothioate,
O-methyl-O-(2,4,5-trichlorophenyl)-phosphoroamidothioate,
O,O-diethyl-O-naphthaloximido-phosphorothionate,
diethyl-4-nitrophenyl-phosphate,
O,O-diethyl-O-(4-nitrophenyl)-phosphorothioate,
dithiophosphoric acid-O,O-diethyl-S-(2,5-dichlorophenyl)-mercapto-methyl ester,
O,O-diethyl-S-(ethylthiomethyl)-phosphorodithioate,
dimethyl-2-chloro-2-diethyl-carbamoyl-1-methylvinyl-phosphorothioate,
bis-(N,N,N',N'-tetramethyl)-diamino-phosphoric acid anhydride,
bis-O,O-diethyl-thionophosphoric acid anhydride,
O,O-diethyl-S-[2-(ethylthio)-ethyl]-phosphorothioate,
O,O-diethyl-O-[2-(ethylthio)-ethyl]-phosphorothioate,
bis-O,O-diethyl-phosphoric acid anhydride,
bis-O,O-(di-n-propyl)-thionophosphoric acid anhydride,
O,O-dimethyl-S-[2-(ethylthio)-ethyl]-phosphorodithioate.

The following examples are given for the purpose of illustrating the invention.

Example 1

The compounds according to the invention are tested in vitro for their esterasis inhibiting action on an enzyme preparation from caterpillar intestines. The degree of the inhibiting action corresponds indirectly to the action as phosphorus insecticide synergistic substance.

The testing of the inhibiting action with intestinal enzyme from caterpillars is carried out as follows.
(a) Enzyme-solution:
$K_m$ caterpillar-intestinal enzyme $>8.10^{-4}$ m.
O,O - dimethyl - O - (3-chloro-4-nitrophenyl)-phosphorothionate
(b) Buffer solution:
0.1 m. caustic soda solution/glycine, pH 8.5;
$5.10^{-4}$ m. magnesium chloride: $3.2.10^{-3}$ m.
O,O - dimethyl - O - (3-chloro-4-nitrophenyl)-phosphorothionate
(c) Inhibitor:
$3.10^{-3}$ m. (end concentration in the test volumes)

The inhibiting action of the phosphorus compounds to be used according to the invention can be seen from the following table:

| Compound tested | Inhibitor-action (in percent) |
|---|---|
| Phenylphosphoric acid-di-sodium salt | 10 |
| Diphenylphosphoric acid sodium salt | 25 |
| 4-chlorophenyl-phosphoric acid-di-sodium salt | 61 |
| Di-(4-chlorophenyl)-phosphoric acid sodium salt | 77 |
| 3-chlorophenyl-phosphoric acid-di-sodium salt | 97 |
| Di-(3-chlorophenyl)-phosphoric acid-sodium salt | 99 |
| 2,4,6 - trichlorophenyl - phosphoric acid - di - sodium salt | 44 |
| Phosphoric- and pyrophosphoric acid ester-mixture according to Example 3 | 73 |
| Phosphoric- and pyrophosphoric acid ester-mixture according to Example 4 | 56 |
| Phosphoric- and pyrophosphoric acid ester-mixture according to Example 5 | 43 |
| Phosphoric- and pyrophosphoric acid ester-mixture according to Example 6 | 34 |
| Phosphoric- and pyrophosphoric acid ester-mixture according to Example 7 | 27 |
| Diethyl - (2 - methyl - 6 - chlorophenyl)-thionophosphate | 20 |
| Diethyl-(2-methyl-6-chlorophenyl)-phosphate | 34 |
| Diethyl-(2,4-dichlorophenyl)-phosphate | 43 |
| Dimethyl-(2-methyl-6-chlorophenyl)-phosphate | 27 |
| Methyl-di-(2-methyl-6-chlorophenyl)-phosphate | 34 |

Example 2

In the following, the testing is described of the mixture of phosphorus compounds produced according to Example 3, effected in vitro, on house flies normally sensitive and resistant against O,O-dimethyl-O-(3-chloro-4-nitrophenyl)-phosphorothioate. The mixture of phosphoric acid compounds according to Example 3 consists substantially of tetra-(2-chloro-6-methylphenyl)-pyrophosphate and 2-chloro-6-methyl-metaphosphate.

Normally sensitive and resistant flies are brought onto substrates which are prepared with O,O-dimethyl-O-(3-chloro-4-nitrophenyl)-phosphorothioate (group A), prepared with the synergistic substance according to the invention (group B) and prepared with O,O-dimethyl-O-(3-chloro-4-nitrophenyl)-phosphorothioate as well as with a synergistic substance according to the invention (group C and group D).

In the following table (a) stands for O,O-dimethyl-O-(3-chloro-4-nitrophenyl)-phosphorothioate and (b) stands for the above-mentioned synergistic mixture. It is stated whether normally sensitive or resistant flies are involved. The last two columns of the table indicate the time after which 50 or 95% of the treated flies had been killed.

As can be seen from the table, the degree of resistance of the resistant flies amounts to more than 10 times the amount of O,O-dimethyl-O-(3-chloro-4-nitrophenyl)-phosphorothioate tolerated by normally sensitive flies. The synergistic substance itself shows only a very weak insecticidal activity, which is more or less the same against normal and against sensitive flies.

| Concentration of active agent | Type of fly | Mean toxicity (LD 50) (in minutes) | Acute toxicity (LD 95) (in minutes) |
|---|---|---|---|
| Group A: | | | |
| 0.05% a | Normal | 120 | 200 |
| 0.005% a | do | 200 | 480 |
| 0.05% a | Resistant | [1] 480 | |
| 0.005% a | do | [2] 480 | |
| Group B: | | | |
| 1.0% b | Normal | 300 | [3] 480 |
| 1.0% b | Resistant | 300 | [3] 480 |
| 0.5% b | Normal | 450 | [4] 480 |
| 0.5% b | Resistant | 450 | [4] 480 |
| 0.25% b | Normal | [1] 480 | |
| 0.25% b | Resistant | [1] 480 | |
| 0.1% b | Normal | [2] 480 | |
| 0.1% b | Resistant | [2] 480 | |
| Group C: | | | |
| 0.05% a+0.05% b | Resistant | 150 | 480 |
| 0.05% a+0.1% b | do | 100 | 175 |
| 0.05% a+0.15% b | do | 90 | 120 |
| 0.05% a+0.25% b | do | 35 | 85 |
| 0.05% a+0.5% b | do | 30 | 50 |
| Group D: | | | |
| 0.05% a+0.05% b | Normal | 120 | 200 |
| 0.05% a+0.1% b | do | 110 | 175 |
| 0.05% a+0.15% b | do | 60 | 90 |
| 0.05% a+0.25% b | do | 35 | 55 |
| 0.05% a+0.5% b | do | 35 | 65 |

[1] (20%).
[2] (0%).
[3] (80%).
[4] (70%).

As can be seen from the table, the addition of the synergistic substance to the O,O-dimethyl-O-(3-chloro-4-nitrophenyl)-phosphorothioate (group C) completely cancels the resistance of the resistant flies, and the effect of the O,O-dimethyl-O-(3-chloro-4-nitrophenyl)-phosphorothioate is raised even above that against normally sensitive flies (group D).

The following table shows that the addition of the synergistic substance to O,O-dimethyl-O-(3-chloro-4-nitrophenyl)-phosphorothioate accelerates the activity against normally sensitive flies.

| Active agent and Concentration | Percentage of destruction minutes after application | | | | |
|---|---|---|---|---|---|
| | 30′ | 40′ | 60′ | 80′ | 100′ |
| a 0.1% | 10 | 25 | 70 | 80 | 100 |
| b 1.0% | 0 | 0 | 0 | 0 | 0 |
| 0.1% a+0.2% b | 50 | 70 | 100 | | |
| 0.1% a+1.0% b | 80 | 95 | 100 | | |

*Example 3*

187 grams of 2-chloro-6-methylphenol are heated with 96 grams of phosphorus oxychloride with slow elevation of the temperature to 200° C. for 10 hours. The low boiling products up to 130° C. at 0.0001 mg. Hg are then distilled off. The residue (160 g.) is introduced while stirring and cooling with ice into a solution of 35 g. of sodium hydroxide and 800 cc. of methanol, filtered from the precipitated sodium chloride and concentrated in vacuum. As residue, 164 g. remain of a highly viscous oil, containing tetra-(2-chloro-6-methyl-phenyl)-pyrophosphate and 2-chloro-6-methyl-phenyl metaphosphate.

*Example 4*

In a manner analogous to that of Example 3, there are obtained from 152 g. of 2,6-dichloro-phenol and 71 g. of phosphorus oxychloride, 86 g. of a highly viscous oil containing tetra-(2,6-dichlorophenyl)-pyrophosphate and 2,6-dichlorophenyl-metaphosphate.

*Example 5*

In a manner analogous to that of Example 3, there are obtained from 143 g. of o-tert.-butylphenol and 73 g. of phosphorus oxychloride, 56 g. of a viscous oil, containing tetra-(2-tert.-butylphenyl)-pyrophosphate and 2 - tert.-butylphenyl metaphosphate.

*Example 6*

142.5 g. of 2-methyl-6-chlorophenol, 76.5 g. of phosphorous oxychloride and 84 g. of pyridine are reacted in 500 cc. of benzene at 0° C., and then 32 g. of methanol and 42 g. of pyridine are added dropwise to the reaction mixture. It is filtered off with suction, washed with water, dried over magnesium sulphate and concentrated in vacuum. 178 g. of a colourless oil are obtained. The compound has the following structure:

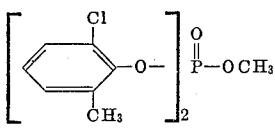

*Example 7*

142.5 g. of 2-methyl-6-chlorophenol, 76.5 g. of phosphorous oxychloride and 84 g. of pyridine are reacted in 500 cc. of benzene at 0° C., filtered off with suction, concentrated in vacuum, taken up in 100 cc. of tetrahydrofurane, and this solution is added dropwise while cooling to 100 cc. of tetrahydrofurane and 9 cc. of water. After 4 hours the mixture is concentrated in vacuum. 170 g. of a viscous syrup remain as residue, which consists of the following compound:

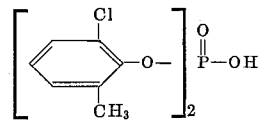

We claim:
1. A composition containing a phosphorus-containing insecticide and as a synergistic agent a compound of the formula

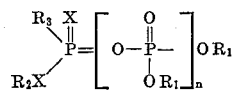

in which $R_1$ and $R_2$ stand for members selected from the group consisting of hydrogen, an alkali metal, an alkaline earth metal, phenyl, halogen-substituted phenyl, lower alkyl-substituted phenyl, lower alkoxy-substituted phenyl, phenoxy-substituted phenyl, lower alkyl-mercapto-substituted phenyl, phenyl-mercapto-substituted phenyl, trifluoromethyl-substituted phenyl, cyano-substituted phenyl and naphthyl and in which $R_3$ stands for a member selected from the group consisting of lower alkyl having up to 4 carbon atoms, hydroxy-substituted lower alkyl having up to 4 carbon atoms, halogen-substituted lower alkyl having up to 4 carbon atoms, amino-substituted lower alkyl having up to 4 carbon atoms, lower alkoxy having up to 4 carbon atoms, lower alkylmercapto having up to 4 carbon atoms and phenylmercapto and in which X stands for a member selected from the group consisting of oxygen and sulfur and $n$ stands for a member selected from the group consisting of zero and a whole number from 1 to 10 said phosphorus-containing insecticide and synergistic agent being in a ratio from 1:0.02 to 1:20.

2. A composition containing a phosphorus-containing insecticide and as a synergistic agent a compound of the formula

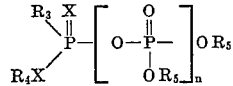

in which $R_3$ stands for a member selected from the group consisting of lower alkyl having up to 4 carbon atoms, hydroxy-substituted lower alkyl having up to 4 carbon atoms, halogen-substituted lower alkyl having up to 4 carbon atoms, amino-substituted lower alkyl having up to 4 carbon atoms, lower alkoxy having up to 4 carbon atoms, lower alkylmercapto having up to 4 carbon atoms and phenylmercapto and in which $R_4$ and $R_5$ stand for members selected from the group consisting of chloro-substituted phenyl and lower alkyl substituted phenyl the lower alkyl of which having up to 4 carbon atoms and in which X stands for a member selected from the group consisting of oxygen and sulfur and $n$ stands for a member selected from the group consisting of zero and a whole number from 1 to 10 in a ratio from 1:0.02 to 1:10.

3. A composition containing a phosphorus-containing insecticide and as a synergistic agent a compound of the formula

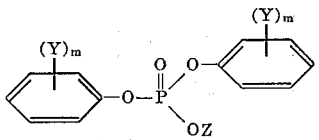

in which Y stands for a chloro atom, Z stands for an alkali metal atom and $m$ stands for a member selected from the group consisting of zero, 1, 2 and 3 in a ratio from 1:0.02 to 1:20.

4. A composition containing a phosphorus-containing insecticide and as a synergistic agent a compound of the formula

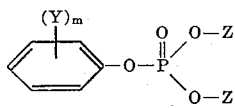

in which Y stands for a chloro atom, Z stands for an alkali metal atom and $m$ stands for a member selected from the group consisting of zero, 1, 2 and 3 in a ratio from 1:0.02 to 1:20.

5. A composition containing a phosphorus-containing insecticide and as a synergistic agent a compound of the formula

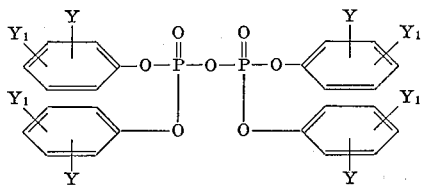

in which Y stands for a chloro atom and in which $Y_1$ stands for lower alkyl having up to 4 carbon atoms in a ratio from 1:0.02 to 1:20.

6. A composition containing a phosphorus-containing insecticide and as a synergistic agent a compound of the formula

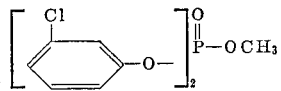

in a ratio from 1:0.02 to 1:20.

7. A composition containing a phosphorus-containing insecticide and as a synergistic agent a compound of the formula

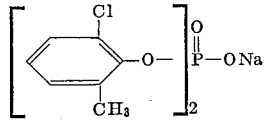

in a ratio from 1:0.02 to 1:20.

8. A composition containing a phosphorus-containing insecticide and as a synergistic agent a compound of the formula

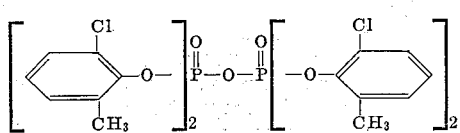

in a ratio from 1:0.02 to 1:20.

9. A composition containing a phosphorus-containing insecticide and as a synergistic agent a compound of the formula

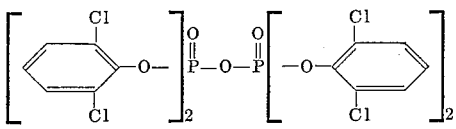

in a ratio from 1:0.02 to 1:20.

10. A composition containing a phosphorus-containing insecticide and as a synergistic agent a compound of the formula

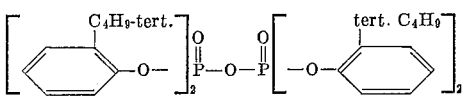

in a ratio from 1:0.02 to 1:20.

11. A composition containing a phosphorus-containing insecticide and as a synergistic agent a compound of the formula

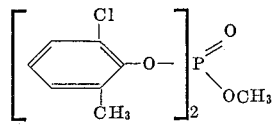

in a ratio from 1:0.02 to 1:20.

12. A composition containing a phosphorus-containing insecticide and as a synergistic agent a compound of the formula

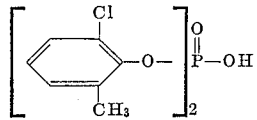

in a ratio from 1:0.02 to 1:20.

13. A process for combating insects which comprises contacting said insect with a mixture consisting of a phosphorus-containing insecticide and as a synergistic agent a compound of the formula

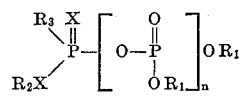

in which $R_1$ and $R_2$ stand for members selected from the group consisting of hydrogen, an alkali metal, an alkaline earth metal, phenyl, halogen-substituted phenyl, lower alkyl-substituted phenyl, lower alkoxy-substituted phenyl, phenoxy-substituted phenyl, lower alkyl-mercapto-substituted phenyl, phenyl-mercapto-substituted phenyl, trifluoromethyl-substituted phenyl, cyano-substituted phenyl and naphthyl and in which $R_3$ stands for a member selected from the group consisting of lower alkyl having up to 4 carbon atoms hydroxy-substituted lower alkyl having up to 4 carbon atoms, halogen-substituted lower alkyl having up to 4 carbon atoms, amino-substituted lower alkyl having up to 4 carbon atoms, lower alkoxy having up to 4 carbon atoms, lower alkylmercapto having up to 4 carbon atoms and phenylmercapto and in which X stands for a member selected from the group consisting of oxygen and sulfur and $n$ stands for a member selected from the group consisting of zero and a whole number from 1 to 10 said phosphorus-containing insecticide and synergistic agent being in a ratio from 1:0.02 to 1:20.

14. The composition according to claim 1 wherein the phosphorus-containing insecticide is selected from the group consisting of O,O-dimethyl-O-(3-chloro-4-nitrophenyl) - phosphorothioate, O,O-diethyl-O-(4-nitrophenyl)-phosphorothioate, O,O-dimethyl-S-(2-(ethylthio)-ethyl)-phosphorothioate and O,O-dimethyl-S-(4-oxobenzotriazine-3-methyl)-phosphorodithioate.

References Cited by the Examiner

UNITED STATES PATENTS 2,947,773  8/1960  Allen _____ 167—30
3,138,522  6/1964  Plapp _____ 107—13

FOREIGN PATENTS 261,807  9/1949  Switzerland.

JULIAN S. LEVITT, *Primary Examiner.*
FRANK CACCIAPAGLIA, Jr., *Examiner.*
STANLEY J. FRIEDMAN, *Assistant Examiner.*